United States Patent Office

2,731,444
Patented Jan. 17, 1956

2,731,444

EPOXIDE RESIN CURED WITH A POLYHYDRIC ALIPHATIC ALCOHOL

Sylvan Owen Greenlee, Racine, Wis., assignor to Devoe & Raynolds Company, Inc., Louisville, Ky., a corporation of New York No Drawing. Application October 21, 1952, Serial No. 316,078

15 Claims. (Cl. 260—47)

This invention relates to epoxide resin compositions and reaction products, and more particularly to compositions made with the use of aliphatic polyhydric alcohols as cross-linking reactants for the expoxide resins.

The epoxide resins which are used with the polyhydric alcohols, and particularly with dihydric alcohols, in the new compositions, and in making the new reaction products, are epoxide resins such as result from the reaction of dihydric phenols with an excess of epichlohydrin and glycerol dichlorhydrin in the presence of caustic alkali, or such as are produced by the reaction of a dihydric phenol with a polyepoxide, such as an aliphatic diepoxide or polyepoxide.

Such epoxide resins are polyether derivatives of polyhydric phenols, with terminal epoxide groups, and these resins may, and usually do, contain also aliphatic hydroxyl groups. Such epoxide resins include diglycid ethers and polyglycid ethers of dihydric phenols and polymeric polyglycid ethers of dihydric phenols. Examples of such resins are described in my prior Patents Nos. 2,582,985 and 2,591,539, and in my prior applications Ser. No. 199,931, filed December 8, 1950, now Patent No. 2,615,007; Ser. No. 250,951, filed October 11, 1951, now Patent No. 2,615,008; Ser. No. 281,681, filed April 10, 1952, and Ser. No. 281,264, filed April 8, 1952.

This application is a continuation-in-part of said prior applications; and said applications Ser. No. 281,264 and 281,681 are continuations-in-part of my prior application Ser. No. 626,449, filed November 2, 1945 (Patent No. 2,592,560); said application Ser. No. 199,931 being a continuation-in-part of my prior application Ser. No. 617,176, filed September 18, 1945, and now abandoned; and said application Ser. No. 250,951 being a continuation-in-part of my prior application Ser. No. 189,063, filed October 7, 1950, and Ser. No. 199,932, filed December 8, 1950, both now abandoned, which applications are continuations-in-part, respectively, of my prior applications Ser. No. 621,856, filed October 11, 1945 and Ser. No. 617,176, filed September 18, 1945, now abandoned.

The aliphatic polyhydric alcohols used with the epoxide resins are polyfunctional cross-linking reactants which serve to cross-link different molecules of the epoxide resin, and particularly dihydric alcohols which react with the epoxide resins to form long chain, high molecular weight polymeric products.

Reaction products differing widely in character are produced with different polyhydric aliphatic alcohols, and with different proportions of epoxide resins and polyhydric alcohols.

One important class and type of reaction products is obtained with the use of aliphatic polyhydric alcohols, used in amounts less than the equivalent amounts, so that the polyhydric alcohols will serve to cross-link the resins by reaction with part of the epoxide groups of the resins to give higher melting point epoxide resins.

Another important class of products results from the use of an excess of polyhydric alcohol with the resins, whereby all of the epoxide groups of the resins are reacted with part of the hydroxyl groups of the aliphatic polyhydric alcohols to give products of special value, e. g., for esterification to form esters, such as drying oil esters.

Another class of products is obtained by the use of equivalent proportions of polyhydric alcohols and epoxide resins, but with incomplete reaction, so that the resulting products will have a part of the epoxide groups of the resins unreacted, as well as hydroxyl groups of the polyhydric alcohols unreacted.

Depending upon the conditions of reaction and the presence of catalysts, such as alkali catalysts in varying amount, the reaction products may be higher melting point epoxide resins, or the reaction may go to the point of forming insoluble, infusible products.

Aliphatic dihydric alcohols have the advantage that they react through primary alcoholic groups with the terminal epoxide groups of the resins to form high molecular weight straight-line polymers which, where less than equivalent amount of alcohol is used, are epoxide resins having distinctive properties because of the alcoholic residues which form part of the polymeric resin molecules.

Another important type of polyhydric alcohol for reaction with the epoxide resins is pentaerythritol and its polymers, such as dipentaerythritol, etc. Thus, pentaerythritol with four alcoholic hydroxyl groups, when used in less than the equivalent amounts of the epoxide resins, can cross-link the resins by reaction with three or four different epoxide groups, while leaving part of the epoxide groups unreacted in the higher melting point epoxide resins.

When pentaerythritol, or its polymers, are used in excess of the equivalent amount, the resulting products, when incompletely reacted, may still contain unreacted epoxide groups, as well as unreacted hydroxyl groups of the pentaerythritol; or, if the reaction is carried to completion with an excess of the pentaerithritol, the resulting reaction products are characterized by a large number of esterifiable hydroxyl groups which make the resulting products valuable products for esterification to form drying oil and other esters.

The primary alcoholic hydroxyl groups of the aliphatic polyhydric alcohols react more readily and preferentially with the epoxide groups of the resin, as compared with the intermediate secondary alcoholic hydroxyl groups contained in the polymeric epoxide resins.

The epoxide resins with which the polyhydric alcohols are used include resins resulting from the reaction of a mixture of a dihydric phenol with epichlorhydrin or glycerol dichlorhydrin and sufficient caustic alkali to combine with the chlorine of the chlorhydrin, the proportion of chlorhydrin (epichlorhydrin or glycerol dichlorhydrin) to dihydric phenol being at least about 1.2 to 1 and up to around 2 to 1; and higher melting point resins which result from the reaction of such resins with a further amount of dihydric phenol less than that equivalent to the epoxide content of the resin.

The epoxide resins include resins made by a two step method of forming high molecular weight epoxide resins in which an initial low molecular weight or melting point epoxide resin is first produced by the reaction of a dihydric phenol and epichlorhydrin or glycerol dichlorhydrin in the presence of caustic alkali sufficient to combine with the chlorine of the chlorhydrin, followed by removal of the byproduct salt and any excess alkali from the initial epoxide resin, with addition of dihydric phenol to the initial epoxide resin and heating the resulting mixture to effect reaction of the dihydric phenol with the initial epoxide resin to form higher melting point and higher molecular weight epoxide resins.

In the first step of the two-step process, low molecular weight or melting point epoxide resins are produced which can be readily washed free from byproduct salt and any excess caustic alkali. Higher melting point epoxide resins cannot be readily washed free from such byproducts. But when the initial low melting point or low molecular weight epoxide resins are further reacted with dihydric phenols in the second step of the process, no byproducts are formed, and the reaction is a direct reaction of addition between the initial epoxide resin and the added dihydric phenol, in the second step of the process.

In making the initial epoxide resins from halohydrins the proportions of the polyhydric phenols and halohydrins are such that, for example, in the case of a dihydric phenol and epichlorhydrin or a dihalohydrin, substantially more than 1 molecular proportion of a difunctional chlorhydrin is used for 1 molecular proportion of dihydric phenol, and 2 or substantially less than 2 molecular proportions of the difunctional chlorhydrin are used for 1 molecular proportion of the dihydric phenol. Similarly with other polyhydric phenols and other polyfunctional chlorhydrins the proportions are such that the halohydrin is more than that which is equivalent to the polyhydric phenol and twice or less than twice the equivalent amount.

In making the initial epoxide resins from halohydrins the reaction of the polyhydric phenols and the halohydrins is advantageously carried out with the use of aqueous alkali in amounts, sufficient to combine with the halogen of the halohydrins used, or in amounts somewhat in excess. Thus where the dihydric phenol is reacted with an epihalohydrin such as epichlorhydrin the proportion of alkali used is sufficient to combine with the chlorine of the epichlorhydrin or an amount somewhat in excess of that amount. When a dihalohydrin such as glycerol dichlorhydrin is used the amount of alkali is sufficient to combine with the chlorine of the dichlorhydrin, or an amount somewhat in excess of that amount. And when mixtures of epichlorhydrin and dichlorhydrin are used, the amount of alkali is similarly sufficient to combine with the chlorine or somewhat in excess of that amount.

The initial epoxide resins vary somewhat in their compositions and properties depending upon the dihydric phenols and chlorhydrins used and the conditions of the reaction.

The primary reaction involved in producing the initial epoxide resins from dihydric phenols and difunctional chlorhydrins, appears to be one in which the phenolic hydroxyls react with the chlorhydrins to give monomeric and straight chain polymeric products such as illustrated by the following formulas or structures:

$$R_1-O-R-O-R_1$$
$$R_1-[O-R-O-R_2]_n-O-R-O-R_1$$

where R is the residue of a dihydric phenol, $R_2$ is an intermediate hydroxyl-containing residue of the chlorhydrin or dichlorhydrin, and $R_1$ is mainly an epoxy-containing residue and to some extent a hydroxyl-containing residue derived from the chlorhydrin. In the above formula $n$ represents the extent of polymerization, e. g. 1, etc.

In general the proportion of terminal epoxide residues or groups in the epoxide resin is in considerable excess of the terminal hydroxide-containing residues, so that the products approach diepoxides, e. g., diglycidyl ethers and polymeric ethers of the dihydric phenols.

The above formula of the polymeric epoxide resins assumes straight chain reaction which appears to be the primary reaction between the dihydric phenols and epichlorhydrin or dichlorhydrin. Reaction is not, however, excluded between the halohydrin and intermediate alcoholic hydroxyl groups such as would give branch chain formulas; and in the case of more complex polymers, where $n$ in the above formula is higher than 1, such side chain reaction products and polydimensional polymers are probably formed to some extent either by reaction of intermediate hydroxyl groups of intermediate reaction products with the halohydrin or with terminal epoxy groups of other intermediate reaction products. Since terminal epoxy groups can also react with terminal hydroxyl groups it may be that part of the polymerization takes place in this way.

It is difficult to determine the exact nature of the complex polymerization process which takes place but I am led to believe that the reaction is primarily one between the phenolic hydroxyls and the chlorhydrins and to a limited extent one of reaction of halohydrins or epoxide groups with aliphatic hydroxyl groups, and that the resulting complex hydroxy-epoxy compositions are largely straight-chain polymeric products of the formula indicated above and to some extent more complex polydimensional structures.

The initial epoxide resins vary from liquid or semi-solid products to solid resins.

The dihydric phenols used in making the intermediate epoxide resins may contain the hydroxyl groups in one nucleus as in resorcinol or in different nuclei of fused ring systems as in 1,5-dihydroxynaphthalene or in different nuclei or ring systems attached by chains composed of one or more atoms, in which case the chains should be free from elements which interfere with the reaction of chlorhydrins with the phenolic hydroxyl groups. The phenolic nuclei or the chains linking phenolic nuclei may contain substituents provided they do not interfere with the desired reaction of the chlorhydrins with the phenolic hydroxyl groups. Illustrative of dihydric phenols which may be used in making the new complex polymerization products are mononuclear phenols such as resorcinol, hydroquinone, catechol, phluorglucinol, etc. and polynuclear phenols such as bisphenol (p,p'-dihydroxydiphenyldimethyl methane), p,p'-dihydroxybenzophenone, p,p'-dihydroxydiphenyl, p,p'-dihydroxydibenzyl, bis-(4-hydroxyphenyl) sulfone, 2,2'-dihydroxy 1,1'-dinaphthyl methane, polyhydroxy naphthalenes and anthracenes, o,p,o', p'-tetrahydroxy diphenyl dimethyl methane and other dihydroxy or polyhydroxy diphenyl or dinaphthyl methanes, etc.

A particularly advantageous polyhydric phenol for use in making the new compositions is bisphenol (p,p'-dihydroxydiphenyldimethyl methane).

The difunctional or polyfunctional chlorhydrins useful in making the initial epoxide resins include monochlorhydrins such as epichlorhydrin, dichlorhydrins such as glycerol dichlorhydrin, bis (3-chloro,2-hydroxy propyl) ether, 1,4-dichloro, 2,3-dihydroxy-butane, 2-methyl-2-hydroxy, 1,3-dichloropropane, bis (3-chloro, 2-methyl, 2-hydroxy propyl) ether and other mono and dichlorhydrins derived from aliphatic olefins, mannitol, sorbitol and other alcohols. Epichlorhydrin is particularly advantageous for use in making the initial resins in the first step of the process.

In making the initial epoxide resins from chlorhydrins the dihydric phenols, e. g., bisphenol, and the polyfunctional chlorhydrins are advantageously all added together at the outset together with aqueous alkali which may be used to dissolve or partly dissolve the polyhydric phenol to form the polyphenoxide or a monophenoxide either before admixture with the chlorhydrin or after admixture. The amount of caustic alkali added to dissolve or partially dissolve the phenol, and whether present at the outset or added in successive amounts, should be sufficient to combine with the chlorine of the chlorhydrin used. With epichlorhydrin for example the amount of caustic alkali should be equal to or somewhat in excess of the theoretical amount for combining with the chlorine of the epichlorhydrin. With glycerol dichlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products as well as the relative proportions of epoxide groups and terminal hydroxy-containing groups.

Products of a predetermined degree of polymerization and of different degrees of polymerization can be obtained by regulating the proportions of the reactants used. Thus, to give a composition having the general or approximate composition indicated by the above formula where $n=1$ the proportions of epichlorhydrin and bisphenol should be about 3:2. Products of higher degree of polymerization and increased complexity of composition are obtained with lower ratios of epichlorhydrin to bisphenol. For example, a product made from 5 mols of epichlorhydrin and 4 mols of bisphenol would have a theoretical composition approximating that of the above formula where $n=3$. A low molecular weight resin varying from a liquid to a soft solid and with a large proportion of liquid monomeric polyethers of dihydric phenols can be made by reacting 2 mols of epichlorhydrin with 1 mol of bisphenol. Yields of products can be obtained which represent or approximate the theoretical yields indicating that the complex polymerization products contain the phenolic and halohydrin residues in substantially the same proportion in which the reactants are used.

The range of proportions and degree of polymerization in making the initial resins can be varied over a considerable range but the chlorhydrin should be in substantial excess of the equivalent proportions to insure terminal epoxy-containing groups and should be twice or less than twice the equivalent proportions. The production of the polymeric products requires in general, in the case of a dihydric phenol and epichlorhydrin or dichlorhydrin, a range of proportions varying from about 2 of the polyhydric phenol and 3 of the difunctional chlorhydrin to a higher proportion of polyhydric phenol to chlorhydrin approaching equivalent proportions but with sufficient excess of the chlorhydrin over equivalent proportions so that the complex polymeric products will contain terminal epoxide groups. With bisphenol and epichlorhydrin ranges of proportions corresponding to that of the above formula where $n$ is from 1 to 5 are particularly advantageous, giving complex reaction products having a melting point up to around 100° C. or higher and from which the salt formed as a by-product and any excess caustic may be removed by washing.

Higher polymeric products of higher melting point which cannot be readily washed to remove salt or any excess caustic can advantageously be produced by the two-step process in which a lower melting polymeric product is first formed which can be readily freed from by-product salt and excess caustic, and with further reaction of this intermediate purified product with an additional amount of dihydric phenol which is less than the equivalent of the epoxide groups of the intermediate product so that the higher polymeric products will still contain epoxy groups.

The process which can be advantageously used in preparing the initial epoxide resins will be illustrated in connection with the reaction of bisphenol with epichlorhydrin.

A caustic soda solution is made containing 1 mol caustic soda per mol of bisphenol dissolved in an amount of water, e. g., twice that of the weight of the bisphenol to be used. The bisphenol is then added to the caustic solution in a suitable reaction kettle provided with a stirrer and stirred until the phenol is dissolved. The use of this amount of alkali is sufficient to convert only half of the phenolic hydroxyls of the bisphenol into phenoxide. The epichlorhydrin is then added to the solution at a temperature of 34–45° C. with continuous agitation of the reaction mixture. The temperature rises over a period of e. g., 30 minutes to around 60–75° C. depending upon the initial temperature, the batch size and the amount of water used, larger amounts of water tending to control the exothermic reaction temperature. The temperature rise due to the exothermic reaction can be controlled to some extent by using larger or smaller amounts of water.

After this preliminary reaction an additional amount of sodium hydroxide conveniently in water solution, and sufficient in amount with that previously added, to react completely with the chlorine of the epichlorhydrin is added, and heat is applied if necessary to raise the temperature to around 80–85° C. over a period of around 15–20 minutes. A further amount of sodium hydroxide in water is advantageously added at this point, in excess of the theoretical amount required to react with all of the chlorine present in the epichlorhydrin, and this amount may advantageously be an appreciable excess of caustic soda to secure a higher degree of polymerization in the reaction mixture or to bring the reaction to the desired extent in a shorter period of time. The mixture is heated to around 95° C. and held at around 95–100° C. for a sufficient length of time to give the desired products which may vary e. g. from ½ hour to 3 hours or more.

The reaction mixture separates into an upper aqueous layer which is drawn off and the residue, e. g., of taffy-like consistence settles to the bottom. This product is then washed by stirring with hot water for 25–30 minutes after which the wash water is drawn off. This washing procedure is repeated e. g., 4 to 6 times, or as many times as is necessary, to effect removal of any unreacted sodium hydroxide and the byproduct sodium chloride. Dilute acids such as acetic or hydrochloric acid may be used to neutralize the excess caustic during washing. It is usually desirable to wash the product entirely free from salt and caustic since failure to remove the unreacted caustic or basic salts such as sodium acetate may result in further polymerization during the drying process when heat is applied to remove the last traces of water. The wet resin is dried by heating and stirring until the temperature rises substantially above the boiling point of water.

The above procedure has been found an advantageous procedure for use in producing the initial epoxide resins. The addition of alkali in stages and with only partial conversion of bisphenol into phenoxide in the first stage results in reaction of the bisphenol with part of the epichlorhydrin and the removal of chlorine from only part of the epichlorhydrin while part of the phenolic hydroxyls of the bisphenol are left in a free state such that they are free to react with epoxide groups. The subsequent addition of caustic is sufficient to remove chlorine from the remaining epichlorhydrin in the further carrying out of the process while the use of a regulated excess of alkali over that required for combining with the chlorine to form salt aids in promoting and controlling the further carrying out of the process.

Where all of the caustic alkali is added at the beginning of the process and all of the reactants are added the reaction is more exothermic and temperature control may be necessary by external cooling or the addition of ice or cold water to keep the reaction under control. Excessive amounts of caustic sometimes causes further polymerization so that it becomes difficult to control the melting point of the product. Lesser amounts of excess caustic approaching the theoretical require longer reaction periods for the process. In general the process should be controlled so that the reaction product does not have a melting point more than 10–15° higher than the temperature of the water used for washing. Thus a product having a softening point or melting point (Durran's Mercury Method) of around 60° C. may be prepared and washed at a temperature above e. g., 45–50° C. A product whose softening point is around 125° C. may be prepared and washed in a closed pressure kettle at temperatures above 110–115° C.

A typical example illustrative of the process in which approximately 3 mols of bisphenol is reacted with 4 mols of epichlorhydrin and an amount of sodium hydroxide approximately 25% in excess of the theoretical is carried out as follows: The ingredients used were as follows: 307.5 pounds bisphenol, 166.3 pounds epichlorhydrin, 96 pounds caustic soda, 600 pounds water. 54 pounds of the caustic were dissolved in 600 pounds of water in an open kettle provided with a mechanical agitator. The bisphenol was added and the mixture stirred for about 10 minutes at a temperature of about 33° C., the epichlorhydrin was added and the temperature increased to about 65° C. from the exothermic heat of reaction. A solution of 18 pounds of caustic soda dissolved in 4 gallons of water was then added with continued stirring with a rise of temperature to around 79° C. Heat was applied to raise the temperature to about 85° C. and a solution of 24 pounds of caustic soda dissolved in 5 gallons of water was added and heating continued while maintaining a temperature around 90 to 100° C. for a period of about 1 hour. External heating was discontinued, 5 gallons of cold water added to check boiling of the water and the upper aqueous layer was then drawn off.

The product was washed with 50–60° gallons of boiling water for a period of 20 minutes, then with a similar amount of boiling water containing acetic acid to neutralize unreacted caustic soda and then 4 times in succession with a similar amount of boiling water. After as much as possible of the water had been removed, external heat was applied with continued stirring to dry the product, the temperature rising to 150° C. The liquid product was drawn off and allowed to solidify, and had a softening point of 95° C. (Durran's Mercury Method).

Higher melting point products which cannot be readily washed with water may advantageously be prepared by proceeding in two steps. Thus where products are desired having a melting point of e. g. around 150° C., such that they cannot be readily freed from salt and excess caustic by washing, they can advantageously be produced by a two step procedure. While such a product if prepared by the above process, could be washed in a pressure kettle with water heated to around 145–150° C., this requires special pressure equipment. The use of such high pressures and temperatures is avoided when the following two step procedure is used.

In this two step procedure an epoxide-containing product is first produced which melts e. g. at 80° C. Such a product can be easily prepared at temperatures above 65–70° C. and washed with hot water at atmospheric pressure in an open or closed kettle. This product, free from caustic, water and salts, is then admixed with an additional amount of polyhydric phenol, less than that corresponding to the epoxy content of the product with which it is admixed, and the mixture then heated to effect the action of the polyhydric phenol with part of the epoxy groups of the initial product to give a product that melts e. g. at 150° C. and which needs no purification since no byproducts are formed in this second step of the process.

In some cases it is desirable, in the second step of the two step process, to add traces of catalysts such as sodium hydroxide or sodium acetate, to catalyze the further reaction to produce the higher melting products but these catalytic substances are used in such small quantities that they are not detrimental to the product for most of its uses, and their removal by washing or other methods is unnecessary.

In order to regulate the amount of dyhydric phenol which is added in the second step of the process the epoxide equivalent of the initial product of the first step of the process is determined, as hereinafter described, and an amount of dihydric phenol is added which is less than that equivalent to the epoxide content so that only part of the epoxide groups of the complex composition are utilized in forming the further polymeric product, and leaving an excess of epoxide content of the resulting product such that it is still an epoxy-hydroxy product still capable of reaction e. g. by polymerization with the addition of a polymerization catalyst, or cross-linking reactant.

The production of epoxide resins suitable for reaction with the polyhydric alcohols will be further illustrated by the following specific examples, but it will be understood that the invention is not limited thereto. The parts are by weight.

Where molecular weight determinations are given they were made by a standard boiling point elevation method. In some cases the molecular weight values corresponded approximately to the theoretical values for a straight chain polymer of the formula given above. In some cases a higher molecular weight value was obtained, seemingly indicating a more complex structure. When short periods of reaction are used incomplete reaction products of lower average molecular weight may be formed which however are capable of further reaction. As above pointed out, an appreciable excess over the theoretical amount of caustic alkali favors the completion of the reactions while excess caustic and prolonged reaction periods seem to favor side reactions.

In some cases the equivalent weights to esterification were determined by heating the epoxide composition with about twice the theoretical amount of linseed oil acids necessary to react with all the hydroxyl and epoxy groups at 228° C. until a constant acid value was obtained. By back titrating the unreacted linseed acids, the esterifiable hydroxyl content was calculated from the acid values. In view of the possibility or probability that some polymerization takes place during this high temperature esterification the results can only be considered a rough indication of the total hydroxyl plus epoxy groups esterified.

The epoxide group content of the complex epoxide resins was determined for practical purposes by determining the equivalent weight of the composition per epoxide group. The method used for determining the epoxide content of the epoxide resins hereinafter indicated was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

The carrying out of the first step of the two-step process, and the production of the initial epoxide resins for use with added dihydric phenol in making the new compositions and in carrying out the second step of the process is illustrated by the following examples:

*Example 1.*—798 parts of bisphenol were dissolved in a caustic soda solution made by dissolving 200 parts of caustic soda in 1730 parts of water in a stainless steel kettle, and 650 parts of epichlorhydrin were added to the closed kettle. The kettle was provided with a stirrer and the mixture was stirred during the process. The temperature rose from around 37° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

In the above example 2 mols of epichlorhydrin are used for 1 mol of bisphenol with an amount of caustic soda somewhat in excess of 2 mols. The softening point of the resulting resinous product determined by Durran's Mercury Method was 43° C. The approximate molecular weight determined by a standard boiling point elevation method was about 451. The determination of the epoxide groups in the product showed an equivalent weight of 325 per epoxide group which would represent approximately 1.39 epoxy groups per molecule of the average molecular weight indicated, and an equivalent weight to esterification of 84.5.

While the product is a homogeneous product, it is a composite product made up of monomeric and polymeric epoxide ethers of bisphenol. By fractional extraction with normal heptane a liquid fraction is obtained, leaving a higher melting point resin. By fractional distillation at 1 micron pressure and between 160° C. and 300° C. approximately half the material distilled and a large part of this distillate was liquid and apparently made up largely of diglycide ether of bisphenol with some hydrolyzed epoxide and some polymeric product. Fractions were thus obtained having an epoxide equivalent of 183 to 184 and fractions having somewhat higher epoxide equivalents up to around 300. The residual resin had a melting point of about 62.5° C. and an epoxide equivalent of about 525. In referring to average molecular weight based on a standard boiling point elevation method, accordingly, and epoxide groups per molecule based on the average molecular weight, these figures do not represent a homogeneous, uniform product but a mixture of monomeric and polymeric liquid and solid resins including diepoxides and polymeric and hydrolyzed products.

*Example 2.*—912 parts of bisphenol were dissolved in aqueous alkali containing 330 parts of sodium hydroxide in 2500 parts of water in an apparatus provided with a stirrer and reflux condenser. 740 parts of epichlorhydrin were added while the solution was at a temperature of 60° C. and cooling was applied to maintain the temperature around 60 to 80° C. for a period of about one and one-quarter hours. After decanting the aqueous liquid the product was repeatedly washed with water and dried in vacuo. The resin was somewhat harder than that of Example 1, having a softening point of about 44° C., and on analysis for epoxide content showing an equivalent weight per epoxide group of about 340.

The second step of the two-step process, in which the epoxide resin first made is further reacted with a dihydric phenol, is illustrated by the following examples:

*Example 3.*—The resin of Example 1 was further reacted by adding 57 parts of bisphenol and 0.055 part of sodium hydroxide to 325 parts of resin, corresponding to an equivalent of about 0.5 phenolic hydroxyls per epoxide group, sufficient to react with only about one-half of the epoxide groups of the resin, and this mixture was heated for 90 minutes at 150° C. and gave a product having a softening point of 74° C. and an equivalent weight to epoxide of 532.

*Example 4.*—The resin of Example 1 was further reacted by adding 114 parts of bisphenol to 325 parts of resin without the addition of sodium hydroxide, the amount of bisphenol being approximately equivalent to the epoxy content of the resin, and this mixture was heated for 90 minutes at 150° C. and gave a higher melting point resin having a softening point of 106° C. and an equivalent weight to epoxide of 1506.

*Example 5.*—A mixture of 5 mols bisphenol and 7 mols epichlorhydrin were reacted with 9.05 mols caustic soda, the reaction going from 40 to 91° C. over 70 minutes and being maintained at 90–104° C. for 75 minutes. The product after washing had a softening point of 84° C., an average molecular weight of 791 and an equivalent weight to epoxide of 591.5 corresponding to an average of about 1.3 epoxy groups per molecule, and an equivalent weight to esterification of 17.5.

The resin as above produced was further reacted by adding 42.4 parts of bisphenol to 591.5 parts of resin, corresponding to an equivalent of 0.372 phenolic hydroxyl per epoxide group and sufficient to react with only about ⅓ of the epoxy groups of the resin, and this mixture was heated for 90 minutes at 200° C. and gave a product having a softening point of 121° C., and equivalent weight to esterification of 205 and an equivalent weight to epoxide of 1248.

When a somewhat larger amount of bisphenol (84.8 parts to 591.5 of resin), representing an equivalent of 0.475 was similarly mixed with the same initial resin and similarly heated, the resulting resin had a softening point of 146° C., an equivalent weight to esterification of 225, and an equivalent weight to epoxide of 3155.

*Example 6.*—A mixture of 3 mols of bisphenol and 4 mols of epichlorhydrin were reacted with the addition of caustic soda solution containing 5.2 mols, the temperature going from 30 to 100° C. in 85 minutes, and being kept at about 100° C. for 65 minutes. The resulting resin after washing and drying had a softening point of 90° C., an average molecular weight of 802, an equivalent weight to epoxide of 730, corresponding to about 1.1 epoxy groups per molecule, and an equivalent weight to esterification of 180.

The resin thus produced was admixed with bisphenol in the proportions of 57 parts of bisphenol to 730 parts of resin (equivalent to 0.5) and a very small amount of caustic soda (1.3 parts to 730 parts of resin) and heated for 90 minutes at 150° C. The resulting resin had a softening point of 127° C. and an equivalent weight to epoxide of 1241.

*Example 7.*—4 mols of bisphenol and 5 mols of epichlorhydrin were reacted with the addition of caustic soda solution (6.43 mols), the reaction going from 40 to 100° C. in 80 minutes, and being kept at 100–104° for 60 minutes. The resulting resin after washing and drying had a softening point of 100° C., an average molecular weight of 1133, an equivalent weight to epoxide of 860, corresponding to about 1.3 epoxide groups per molecule, and an equivalent weight to esterification of 200.

The resin thus produced was admixed with 33 parts of hydroquinone to 860 parts of resin (0.6 equivalent to epoxide) and the mixture heated for 90 minutes at 200° C., giving a resulting resin having a softening point of 125° C., and an equivalent weight to epoxide of 1686.

When the same resin was similarly heated with 114 parts of bisphenol to 860 parts of resin, the resulting product had a softening point of 164° C. and an equivalent weight to epoxide of 5595.

*Example 8.*—A mixture of 6 mols of hydroquinone and 7 mols of epichlorhydrin were reacted with the addition of a solution of 7.5 mols of caustic soda, the reaction going from 29–99° C. in 85 minutes, and being held at 99–103° C. for 75 minutes. The resulting resin after washing and drying had a softening point of 92° C. and an equivalent weight to epoxide of 1105.

The resin thus produced was admixed with bisphenol in the proportions of 55.5 parts of bisphenol to 1105 parts of resin (0.48 equivalent to epoxide) and heated for 90 minutes at 200° C., giving a resin with softening point of 165° C.

In a similar way, other dihydric phenols can be reacted with epichlorhydrin to produce other initial low melting point epoxide resins which can similarly be freed from salt and excess alkali and then further reacted with added dihydric phenol in the second step of the process.

Instead of using epichlorhydrin for making the initial epoxide resin, glycerol dichlorhydrin can be similarly used.

The products made by the two-step process, in which the amount of added dihydric phenol in the second step is less than that which is equivalent to the epoxy content of the initial resin of the first step will be complex epoxy resins of higher melting point.

In general, the initial epoxy resins, and also the higher melting epoxide resins produced in the two-step process, are soluble, unless too highly polymerized, in solvents such as acetone, methyl ethyl ketone, diacetone alcohol, cyclohexanone, etc. The resins of lower melting point and lower degree of polymerization are soluble in toluene but the higher melting resins such as those produced by the two-step process are insoluble in this solvent. Solutions of the resins can be used in making clear and pigmented varnishes, in making transparent films and filaments, and in impregnating and laminating and coating wood, fabrics, and other porous or fibrous materials, etc. When a small amount of a suitable catalyst is added to the solution, the resulting film or coating, on heating, is converted into an infusible insoluble product.

The epoxide resins produced by the two-step process are capable of further reaction by polymerization or with other reagents to form final reaction products.

The foregoing description of the resins has to do with resins produced from dihydric phenols and epichlorhydrin, as described in my prior applications Ser. Nos. 199,931 and 250,951.

Instead of using such epoxide resins, the epoxide resins can be used which are produced by the reaction of dihydric phenols with aliphatic polyepoxides, as described in my applications Ser. Nos. 281,264 and 281,681. Such epoxide resins, like those produced from dihydric phenols and epichlorhydrin, vary in molecular weight and melting point, but contain terminal epoxide groups capable of reaction with the hydroxyl groups of aliphatic polyhydric alcohols.

The expoide resins produced by the different processes and described, e. g., in said prior applications, including those produced by the one-step process and the two-step process, contain reactive terminal epoxide groups and can be reacted with compounds containing active hydrogen, such as amines, and particularly polyamines, amides, mercaptans, polyhydric alcohols, polyimines, etc., to give a wide variety of valuable reaction products. Thus, difunctional reactants or polyfunctional reactants may serve to cross-link different molecules through reaction with terminal epoxide groups and in some cases through intermediate hydroxyl groups. The use of less than the equivalent amount of cross-linking reagents enables modified products to be obtained and in some cases infusible products.

The polyhydric alcohols are polyfunctional reactants which react with terminal epoxide groups of the resins. Even though the resins may contain intermediate aliphatic hydroxyl groups, these are secondary hydroxyl groups and the aliphatic polyhydric alcohols react preferentially with the epoxide resins through their primary hydroxyl groups.

The invention will be further illustrated by the following examples, but it will be understood that the invention is not limited thereto.

The following examples illustrate the use of an excess of epoxide resin with aliphatic polyhydric alcohols to form new epoxide resins.

*Example 9.*—The epoxide resin used had a melting point of 100° C. and a weight per epoxide of 767, and was produced by a two-step process, the initial low melting point resin being produced from 5.64 mols of bisphenol and 7.79 mols of epichlorhydrin in the presence of aqueous caustic alkali and having a melting point of 82.5° C., and this resin being heated with 0.155 mol bisphenol for 1½ hours at 200° C. to give the higher melting point epoxide resin.

19.4 parts of this epoxide resin and 0.5 part of pentaerythritol, corresponding to a ratio of epoxide groups of the resin to hydroxyls of the pentaerythritol of approximately 2:1 were heated for ½ hour at 200° C., giving an epoxide resin reaction product with a melting point of 100° C.

*Example 10.*—The resin used was an epoxide resin produced by a two-step process similar to that referred to in Example 9, but with the use of 5.4% of bisphenol in the second step of the process to give a resin having a weight per epoxide of 1013 and a melting point of 110° C.

19.7 parts of this epoxide resin and 0.5 part of pentaerythritol, corresponding to a ratio of epoxy groups of the resin to hydroxyl groups of the alcohol of about 2:1, were placed in a vessel and heated to 200° C. for ½ hour. The reaction product was an epoxide resin having a melting point of 111° C.

*Example 11.*—The epoxide resin used had a melting point of 40–45° C. with an epoxide equivalent of 313 and was produced by the reaction of epichlorhydrin with bisphenol in the presence of aqueous caustic alkali.

313 parts of this resin and 31.7 parts of dipentaerythritol were heated for 20 minutes at 150° C. The resulting reaction product, when dropped on glass and solidified, gave a clear, solid product. The proportion of epoxide groups in the resin to hydroxyl groups in the alcohol was approximately 2:1.

*Example 12.*—15.8 parts of an epoxide resin produced from bisphenol and epichlorhydrin in the presence of aqueous alkali and having a melting point of 40–45° C. and an epoxide equivalent of 300 to 375, and 22 parts of polymerized ethylene oxide or polyethylene glycol having a molecular weight of approximately 1500 and with 2 terminal alcoholic hydroxyl groups, sold under the trade name Carbowax 1500, were heated with stirring for 1½ hours at 250° C., giving a semi-solid reaction product. In this example, the epoxy to hydroxy ratio is approximately 1.7:1.

*Example 13.*—50 parts of an epoxide resin produced from bisphenol and epichlorhydrin in aqueous caustic alkali and having a melting point of approximately 40–45° C. and a weight per epoxide of approximately 900, together with 50 parts of polyethylene glycol, sold under the trade name Carbowax 4000, were heated for 29 minutes at 250–300° C. The ratio of epoxy to hydroxy was approximately 1.67:1. The reaction product was hard, wax-like and somewhat crystalline, with a melting point of 30° C. and an epoxide equivalent of 1671.

*Example 14.*—1308 parts of a similar resin to that of the preceding example, having a weight per epoxide of 327 and a melting point of 42° C., together with 62 parts of ethylene glycol, where heated with stirring and with slight reflux from a reflux condenser for 6½ hours at 173–238° C. The epoxy to hydroxy ratio was approximately 2:1. The reaction product had a melting point of 74° C., a weight per epoxide of 617, a viscosity of G, and a color of 6–7 at 40% solids in butyl Carbitol.

*Example 15.*—1090 parts of a similar resin to that of the preceding examples, but having a weight per epoxide of 327 and a melting point of approximately 40–45° C., together with 83 parts of ethylene glycol, were heated with agitation and refluxing for 4¼ hours at 185–251° C. The epoxy to hydroxy ratio is approximately 1.25:1. The reaction product had a melting point of 90° C., a weight per epoxide of 1759.4, a viscosity of P, and color of 11 at 40% solids in butyl Carbitol.

*Example 16.*—19.9 parts of a similar epoxide resin produced from bisphenol and epichlorhydrin and having a weight per epoxide of 325 and a melting point of 43° C. together with 3 parts of tetraethylene glycol were heated in the presence of 0.5% sodium phenoxide for 1 hour at 150° C. The epoxy to hydroxy ratio is approximately 2:1. The reaction product had a melting point of about 43° C.

*Example 17.*—25.6 parts of the same resin referred to in the preceding example and 0.5 parts of triglycerol were heated for ½ hour at 200° C. in the presence of 0.2% sodium phenoxide. The epoxy to hydroxy ratio was approximately 2.14:1. The reaction product had a melting point of 109° C.

The following examples illustrate the reaction of an excess of epoxide resin with polyhydric alcohols to form a gel or an insoluble product.

*Example 18.*—The epoxide resin used had a melting point of 146° C. and a weight per epoxide of 3155 and was produced by a two-step process in which the initial epoxide resin, produced by the reaction of bisphenol and epichlorhydrin in the presence of caustic alkali, had a melting point of 85° C. and a higher melting point resin resulting from the reaction of such resin with additional bisphenol had the melting point and epoxide equivalent indicated.

44.1 parts of this epoxide resin and 0.25 parts of pentaerythritol were heated at 200° C. for ½ hour, when the reaction product solidified to form a gel. In this example, the ratio of epoxy to hydroxy was approximately 2:1. This example illustrates the cross-linking of the high molecular weight epoxide resin by reaction with a relatively small proportion of pentaerythritol to form a solid, infusible reaction product.

*Example 19.*—41.1 parts of the same resin as in Example 18 and 0.25 parts of pentaerythritol were heated in the presence of 0.2% of sodium phenoxide at 200° C. for ½ hour and the reaction product in this case also was an insoluble gel.

*Example 20.*—The resin used was a resin produced from bisphenol and epichlorhydrin by the two-step process and had a weight per epoxide of 1179 and a melting point of 112° C.

19 parts of this resin and 0.25 parts of ethylene glycol were heated in the presence of 0.2% sodium phenoxide at 200° C. for ½ hour, when the reaction product was converted into a gel. In this example, the epoxy to hydroxy ratio is approximately 2:1.

*Example 21.*—17.8 parts of a similar two-step process resin produced from bisphenol and epichlorhydrin having a weight per epoxide of 860 and a melting point of 100° C., together with 1 part of tetraethylene glycol, were heated in the presence of 0.5% sodium phenoxide at 150° C. for 1 hour, whereupon the reaction product was converted into an insoluble, infusible gel. In this example, the ratio of epoxy to hydroxy is approximately 2:1.

*Example 22.*—The epoxide resin used had a weight per epoxide of 1158 and a melting point of 132° C. and was prepared by the reaction of 1.65 mols of 5,5' dichloro 2,2' dihydroxy diphenyl methane and 2.48 mols of epichlorhydrin in the presence of aqueous caustic alkali.

24 parts of this resin and 1 part of tetraethylene glycol were heated in the presence of 0.2% sodium phenoxide at 200° C. for ½ hour, whereupon the reaction product was converted into a gel. The epoxy to hydroxy ratio in this example is approximately 2:1.

*Example 23.*—The epoxide resin used had a weight per epoxide of 1298 and a melting point of 101° C., and was prepared by reacting 4 mols of resorcinol and 5 mols of epichlorhydrin in the presence of aqueous caustic alkali.

21.7% of this resin and 0.25 part of trimethylene glycol, corresponding to an epoxy to hydroxy ratio of approximately 2.54:1, were heated in the presence of 0.2% sodium phenoxide at 200° C. for ½ hour, whereupon the reaction product formed a gel.

*Example 24.*—The resin used had a weight per epoxide of 815 and a melting point of 93° C., and was prepared by reacting 6 mols of bisphenol and 7.2 mols of epichlorhydrin in the presence of aqueous caustic alkali.

18 parts of this resin and 0.5 parts of isobutylene glycol, corresponding to an epoxy to hydroxy ratio of approximately 2:1, were heated in the presence of 0.5% sodium phenoxide at 200° C. for ½ hour, whereupon the reaction mixture formed a gel.

*Example 25.*—22.7 parts of the same epoxide resin as in Example 22 and 0.5 part of hexylene glycol, corresponding to an epoxy to hydroxy ratio of approximately 2.32:1, were heated in the presence of 0.2% sodium phenoxide at 200° C. for ½ hour, whereupon the reaction mixture formed a gel.

*Example 26.*—19.3 parts of the same epoxide resin as in Example 22 and 0.25 parts of mannitol, corresponding to an epoxy to hydroxy ratio of about 2:1, were heated in the presence of 0.5% sodium phenoxide at 200° C. for ½ hour, when the reaction product formed a gel.

The following examples illustrate the reaction of equivalent amounts of epoxide resins and polyhydric alcohols with incomplete reaction to form new epoxide resin compositions and reaction products.

*Example 27.*—An epoxide resin produced from bisphenol and epichlorhydrin and having a weight per epoxide of 320 and a melting point of approximately 40 to 45° C. was used in this example.

640 parts of this resin and 68 parts of pentaerythritol, corresponding to an approximately equal ratio of epoxy to hydroxy groups, were heated for 25 minutes at 250° C., when the product gave a clear, hard drop on glass. The resulting reaction product had an epoxide value of 832 and an acetyl value of 396.

*Example 28.*—60 parts of a similar epoxide resin to that of the preceding example and having a weight per epoxide of 300, together with 28 parts of diolin (1,12 dihydroxy octadecane) wherein the epoxy to hydroxy ratio is approximately equal, were heated for 12 minutes at 300 to 305° C., when the reaction product gave a clear drop on glass. The reaction product was a solid, opaque, wax-like material having a melting point of 50° C. (Durran's) and an epoxide value of 619.

*Example 29.*—The resin used was produced from bisphenol and epichlorhydrin and had a weight per epoxide of approximately 500 and a melting point of approximately 65–75° C.

100 parts of this resin and 28 parts of diolin, corresponding to approximately equal ratios of epoxy to hydroxy groups, were heated for 33 minutes at 250–300° C., when a clear, hard drop was observed on glass. The reaction product was very hard, opaque and somewhat crystalline, and had a melting point of 72° C. and an epoxide value of 1050.

*Example 30.*—The resin used was produced from epichlorhydrin and bisphenol and had a melting point of 43° C. and a weight per epoxide of 325.

19.9 parts of this resin and 6 parts of tetraethylene glycol, corresponding to an epoxy to hydroxy ratio of approximately 1:1, were heated in the presence of 0.5% sodium phenoxide for ½ hour at 150° C. The reaction product had substantially the same melting point, 43° C., as the epoxide resin before reaction.

*Example 31.*—61.6 parts of a similar epoxide resin having an epoxide equivalent of approximately 308, together with 100 parts of Carbowax 1000 (polyethylene glycol) wherein the epoxy to hydroxy ratio is approximately 1:1, were heated 10 minutes at 250–300° C. Methyl alcohol was added to the reaction mixture and the solution allowed to stand over night. A wax-like solid separated from the solution, was washed with water, taken up in warm alcohol, and the alcohol evaporated to give a heavy, liquid, wax-like material.

*Example 32.*—61.6 parts of a similar epoxide resin having a weight per epoxide of approximately 308 and a melting point of around 40–45° C., together with 60 parts of Carbowax 600 (polyethylene glycol), wherein the epoxy to hydroxy ratio is approximately 1:1, were heated for 15 minutes at 250–300° C. The reaction product was a viscous liquid, soluble in methyl alcohol.

*Example 33.*—30 parts of a similar resin having a weight per epoxide of 300, together with 150 parts of Carbowax 4000 (polyethylene glycol) wherein the epoxy to hydroxy ratio is approximately 1:1, were heated for 35 minutes at 250–300° C. The reaction product was wax-like and somewhat crystalline, having a melting point of 35° C. and an epoxide value of 3089. This product emulsifies quite easily in water and is soluble in warm alcohol.

*Example 34.*—160 parts of an epoxide resin having a melting point of 95–105° C. and a weight per epoxide of approximately 800 and produced from bisphenol and epichlorhydrin, together with 100 parts of Carbowax 1000, wherein the epoxy to hydroxy ratio is approximately 1:1, were heated for 25 minutes at 280–300° C. The reaction product was a somewhat sticky wax-like material, soluble in a 50/50 mixture of xylene and alcohol.

*Example 35.*—32 parts of the same resin as in the preceding example and 20 parts of Carbowax 4000, together with 15 parts of Carbowax 1000, were heated 15 minutes at 290–300° C. The mixture had an epoxy to hydroxy ratio of approximately 1:1. The reaction product was an opaque wax-like solid, soluble in a 50/50 xylene-alcohol mixture.

*Example 36.*—53.3 parts of a similar epoxide resin having a weight per epoxide of 1066, togeher with 100 parts of Carbowax 4000, wherein the epoxy to hydroxy ratio is approximately 1:1, were heated 25 minutes at 295–300° C. The reaction product was dark, transparent and waxy, and had an epoxide value of 3300. The product was soluble in alcohol and formed a wax coating on wood or metal which would readily polish.

The following examples illustrate the use of equivalent amounts of epoxide resin and polyhydric alcohols to form insoluble, infusible products or gels.

*Example 37.*—The epoxide resin used was produced by a two-step process from bisphenol and epichlorhydrin, the initial epoxide resin having a melting point of 86° C., and the resin produced by the two-step process of heating this resin with bisphenol had a melting point of 121° C. and a weight per epoxide of 1248.

16.7 parts of this resin and 1 part of triethylene glycol, corresponding to an epoxy to hydroxy ratio of approximately 1:1, were heated in the presence of 0.2% sodium phenoxide at 200° C. for ½ hour, when the reaction product formed a gel.

*Example 38.*—28.8 parts of the same resin used in Example 21 and 0.5 parts of diethylene glycol, corresponding to an epoxy to hydroxy ratio of about 1:1, were heated in the presence of 0.2% sodium phenoxide at 200° C. for ½ hour, when the reaction product formed a gel.

*Example 39.*—17.8 parts of an epoxide resin produced from epichlorhydrin and bisphenol and having a weight per epoxide of 860 and a melting point of 100° C., together with 2 parts of tetraethylene glycol, were heated in the presenec of 0.5% sodium phenoxide at 150° C. for 1 hour, when the reaction product formed a gel. The ratio of epoxy to hydroxy groups in this mixture was approximately 1:1.

*Example 40.*—19.4 parts of the same resin as in Example 9 and 1 part of dipentaerythritol, corresponding to an epoxy to hydroxy ratio of approximately 1:1, were heated in the presence of 0.2% sodium phenoxide at 200° C. for ½ hour, when the reaction product formed a gel.

*Example 41.*—19.7 parts of the same epoxide resin as in Example 10 and 1 part of polypentaerythritol, wherein the epoxy to hydroxy ratio is approximately 1:1, were heated in the presence of 0.2% sodium phenoxide at 200° C. for ½ hour, when the reaction product formed a gel.

The following examples illustrate the use of an excess of polyhydric alcohol with an epoxide resin, with incomplete reaction of the resin and alcohol to form a reaction product containing both unreacted epoxy and alcoholic hydroxyl groups.

*Example 42.*—626 parts of an epoxide resin produced from bisphenol and epichlorhydrin having a weight per epoxide of 313 and a melting point of 40–45° C., together with 136 parts of pentaerythritol, corresponding to a ratio of epoxy to hydroxy of approximately 1:2, were heated with vigorous stirring at 250° C. until a clear pill was observed on glass. The resulting product had a melting point of 95–100° C. (Durran's), an epoxide value of 995, and an acetyl value of 470. After further heating the product for 1 hour at 240° C., the reaction product became a hard, infusible material.

*Example 43.*—480 parts of a similar epoxide resin having a weight per epoxide of 308 and 68 parts of pentaerythritol, corresponding to a ratio of epoxy to hydroxy of approximately 1:133, were heated with stirring for 15 minutes at 250° C., when a clear bead was observed on glass. The resulting reaction product had an epoxide value of 1140 and an acetyl value of 400.

*Example 44.*—2 parts of a similar epoxide resin having a weight per epoxide of 316, together with 33.8 parts of Carbowax 6000, corresponding to a ratio of epoxy to hydroxy of about 1:1.76, were heated with stirring for 1½ hours at 250° C. The reaction product was a somewhat soft, waxy solid, having a weight per epoxide of 4860, showing approximately 48% modification of the epoxide resin.

*Example 45.*—308 parts of a similar epoxide resin having a weight per epoxide of 308 and 46 parts of glycerine, corresponding to a ratio of epoxy to hydroxy of about 1:1.5, were heated for 22 minutes at 250–260° C., when the reaction mixture showed a clear pill on glass. The reaction product had a melting point of 92° C., an epoxide value of 392, and an acetyl value of 89.

*Example 46.*—80 parts of an epoxide resin produced from bisphenol and epichlorhydrin having a weight per epoxide of 800 and a melting point of approximately 95–105° C., together with 28 parts of diolin, corresponding to an epoxy to hydroxy ratio of about 1:2, were heated for 23 minutes at 290–300° C., when a clear, hard, brittle drop on glass was observed. The reaction product was clear, dark, hard and brittle and had a melting point of 82° C. and an epoxide value of 1904.

*Example 47.*—19.7 parts of an epoxide resin produced from bisphenol and epichlorhydrin having a weight per epoxide of 316 and a melting point of 40–45° C., together with 5.2 parts of pentanediol 1,5, corresponding to an epoxy to hydroxy ratio of about 1:1.6, were heated with stirring for 1 hour at 250° C. The reaction product was a clear, tacky solid having a weight per epoxide of 2025, showing about 75% modification of the epoxide resin.

*Example 48.*—308 parts of a similar epoxide resin having a weight per epoxide of 308, together with 46 parts of mannitol, corresponding to an epoxy to hydroxy ratio of about 1:1.5, were heated for 15 minutes at 250–270° C., when the reaction mixture formed a clear pill on glass. The reaction product had a melting point of 130° C., an epoxide value of 1085, and an acetyl value of 475.

The following examples illustrate the production of esters from reaction products of the epoxide resins and polyhydric alcohols.

*Example 49.*—130 parts of an epoxide resin produced from bisphenol and epichlorhydrin having a melting point of 55—65° C. and an epoxide equivalent of 375 to 450, together with 27 parts of pentaerythritol, was heated at 235 to 250° C. for 10 minutes. The resulting reaction product had an epoxide value of 1900, an acetyl value of 428, and was a hard, clear product. The ratio of epoxy to hydroxy in the reaction mixture was approximately 1:2.7.

A mixture of 102 parts of such reaction product and 200 parts of linseed fatty acids were heated at 220° C. for 5 hours and at 260–275° C. for 2½ hours. 0.3% lead and 0.03% cobalt dryers were added to a 50% xylene solution of the product, and an 0.003 mm. film drawn on glass. The film was tack-free in 40 minutes, dry in 24 hours, and very tough, hard, and mar-resistant after 48 hours.

To another sample of the product, 0.06% cobalt dryer was added to a 50% xylene solution and 0.003 mm. film drawn on glass. The film was tack-free after 45 minutes and, after 24 hours, the film was hard, tough, clear and mar-resistant.

*Example 50.*—A mixture of 640 parts of the reaction product of Example 14 and 160 parts of soya fatty acids was heated at 235° C. for 1 hour and 20 minutes in the presence of xylene, and the solvent then removed. The product had an acid value of 0.47. The esterified product was soluble in butyl alcohol.

*Example 51.*—A mixture of 640 parts of the reaction product of Example 15 and 160 parts of soya fatty acids was heated at 230–250° C. for 2½ hours in the presence of xylene, and the solvent then removed. The product had an acid value of 0.62. It was soluble in butyl acetate.

The different products produced by the reaction of epoxide resins with polyhydric alcohols will vary in their esterification properties. Both the epoxide groups and the hydroxyl groups are capable of esterification, but when esterified with fatty acids, the epoxide groups, when present, tend to react first. Esterified products can be produced with drying oil acids and the esterified products may be partial esters or more or less complete esters, depending upon the extent of esterification.

The reaction products can themselves be further reacted with various polyfunctional cross-linking reactants, including polyfunctional reactants which react through terminal epoxide groups, where such groups are present, or through hydroxyl groups.

Polyfunctional cross-linking reactants which can further react with epoxide resins include reactants such as amines, etc.

Other polyfunctional reactants can be used with the reaction products, such as di-isocyanates, dialdehydes, di-mercaptans, etc.

The new epoxide resins which result from the reaction of the epoxide resins with less than the equivalent amount of polyhydric alcohol, are themselves valuable resins for use in coating compositions or in molding mixtures or adhesives, etc., as well as for esterification to form drying and other esters.

I claim:

1. An epoxide resin composition comprising an epoxide resin which is a polyether derivative of a dihydric phenol having terminal epoxide groups and free from reactive groups other than epoxide aliphatic hydroxyl groups and a polyhydric aliphatic alcohol containing only carbon, hydrogen and oxygen and selected from the group which consists of aliphatic hydrocarbons substituted only by hydroxyl groups, polyglycols, polyglycerols and polypentaerythritols free from oxygen containing groups other than ether oxygen and hydroxyl groups and said polyhydric alcohol having at least two primary hydroxyl groups as a cross-linking reactant for the epoxide resin, the proportions of epoxide resin and polyhydric alcohol being such that the epoxide groups of the resin are at least equal to the primary alcoholic groups of the alcohol.

2. A composition as defined in claim 1, in which the polyhydric alcohol is an aliphatic dihydric alcohol.

3. A composition as defined in claim 1, in which the polyhydric alcohol is a pentaerythritol.

4. A composition as defined in claim 1, in which the polyhydric alcohol is a polyethylene glycol.

5. An epoxide resin reaction product resulting from the reaction of an epoxide resin, which is a polyether derivative of a dihydric phenol having terminal epoxide groups and free from reactive groups other than epoxide and aliphatic hydroxyl groups, with less than the equivalent amount of a polyhydric aliphatic alcohol containing only carbon, hydrogen and oxygen and selected from the group which consists of aliphatic hydrocarbons substituted only by hydroxyl groups, polyglycols, polyglycerols and polypentaerythritols free from oxygen containing groups other than ether oxygen and hydroxyl groups and said polyhydric alcohol having at least two primary alcoholic hydroxyl groups, the polyhydric alcohol serving as a cross-linking reactant through reaction of its hydroxyl groups with the epoxide groups of the resin, and the reaction product containing unreacted epoxide groups.

6. A composition as defined in claim 5, in which the polyhydric alcohol is an aliphatic dihydric alcohol.

7. A composition as defined in claim 5, in which the polyhydric alcohol is a pentaerythritol.

8. A composition as defined in claim 5, in which the polyhydric alcohol is a polyethylene glycol.

9. An epoxide resin reaction product resulting from the reaction of an epoxide resin, which is a polyether derivative of a dihydric phenol having terminal epoxide groups and free from reactive groups other than epoxide and aliphatic hydroxyl groups, with an amount of a polyhydric alcohol containing only carbon, hydrogen and oxygen and selected from the group which consists of aliphatic hydrocarbons substituted only by hydroxyl groups, polyglycols, polyglycerols and polypentaerythritols free from oxygen containing groups other than ether oxygen and hydroxyl groups and said polyhydric alcohol having at least two primary alcoholic groups which is at least equivalent to the epoxide resin, the reaction between hydroxyl groups of the alcohol and epoxide groups of the resin being incomplete and the resulting product containing both unreacted epoxide groups of the resin and unreacted hydroxyl groups of the alcohol.

10. An epoxide resin reaction product resulting from the reaction of an epoxide resin, which is a polyether derivative of a dihydric phenol having terminal epoxide groups and free from reactive groups other than epoxide and aliphatic hydroxyl groups with more than the equivalent amount of a polyhydric aliphatic alcohol containing only carbon, hydrogen and oxygen and selected from the group which consists of aliphatic hydrocarbons substituted only by hydroxyl groups, polyglycols, polyglycerols and polypentaerythritols free from oxygen containing groups other than ether oxygen and hydroxyl groups and said polyhydric alcohol having at least 2 primary alcoholic hydroxyl groups, the polyhydric alcohol serving as a cross-linking reactant through reaction of its hydroxyl groups with the epoxide groups of the resin.

11. The method of producing epoxide resin reaction products which comprises reacting an epoxide resin, which is a polyether derivative of a dihydric phenol having terminal epoxide groups and free from reactive groups other than epoxide and aliphatic hydroxyl groups, with a polyhydric aliphatic alcohol containing only carbon, hydrogen and oxygen and selected from the group which consists of aliphatic hydrocarbons substituted only by hydroxyl groups, polyglycols, polyglycerols and polypentaerythritols free from oxygen containing groups other than ether oxygen and hydroxyl groups and said polyhydric alcohol having at least 2 primary alcoholic hydroxyl groups, the polyhydric alcohol serving as a cross-linking reactant through reaction of its hydroxyl groups with the epoxide groups of the resin, the proportions of epoxide resin and polyhydric alcohol being such that the epoxide groups of the resin are at least equal to the primary alcoholic groups of the alcohol.

12. The process according to claim 11 in which the amount of polyhydric alcohol is less than the equivalent and in which the reaction is carried to the point of producing a reaction product still containing unreacted epoxide groups.

13. The process according to claim 11, in which the equivalent amount of polyhydric alcohol is used with the epoxide resin, with incomplete reaction of alcoholic and epoxide groups to produce an incomplete reaction product still containing unreacted epoxide groups of the resin and hydroxyl groups of the alcohol.

14. The process according to claim 11 in which more than the equivalent amount of polyhydric alcohol is reacted with the epoxide resin and in which the reaction is terminated before all of the epoxide groups of the resin are reacted, to give a reaction product containing both unreacted epoxide groups of the resin and hydroxyl groups of the alcohol.

15. The process according to claim 11, in which an alkali catalyst is used and the reaction is carried to substantial completion to produce an insoluble infusible product.

(References on following page)

References Cited in the file of this patent

UNITED STATES PATENTS

| | | |
|---|---|---|
| 2,444,333 | Castan | June 29, 1948 |
| 2,500,449 | Bradley | Mar. 14, 1950 |
| 2,528,360 | Greenlee | Oct. 31, 1950 |
| 2,627,483 | Dowd | Feb. 3, 1953 |

FOREIGN PATENTS

| | | |
|---|---|---|
| 960,044 | France | Oct. 17, 1949 |
| 497,540 | Belgium | Feb. 12, 1951 |